May 25, 1926.
J. P. BURKE
MULTIPLE WORM GEARING
Filed April 3, 1925
1,586,285
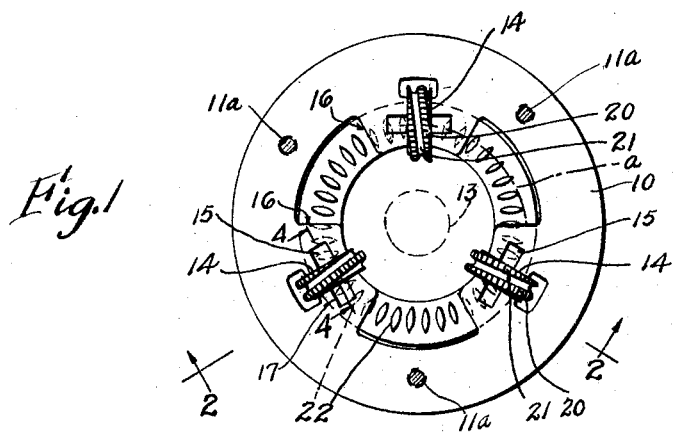
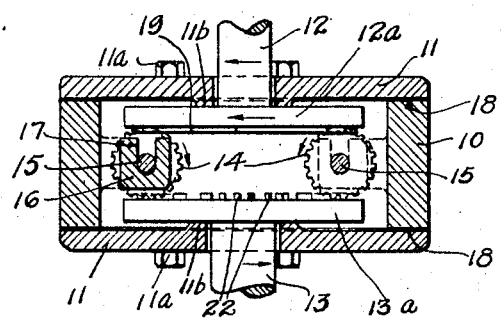
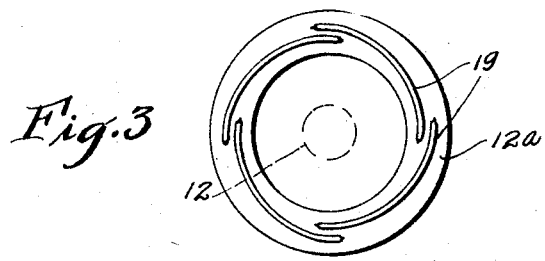
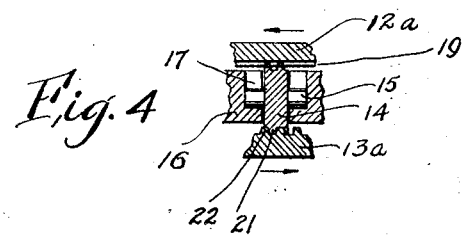
INVENTOR
J. P. Burke
BY
Geo. L. Beebe
ATTORNEY Patented May 25, 1926.

1,586,285

UNITED STATES PATENT OFFICE.

JAMES P. BURKE, OF NEWARK, NEW JERSEY, ASSIGNOR TO JAMES R. ENGLISH, OF NEWARK, NEW JERSEY.

MULTIPLE WORM GEARING.

Application filed April 3, 1925. Serial No. 20,328.

This invention relates to gearing and more particularly to devices of that general nature adapted for the transmission of power at a reduced rate of speed.

Among the objects of this invention is to provide a gear arrangement for the transmission of power between a pair of coaxial shafts, said arrangement requiring but a minimum of essential parts or gears and permitting of a high speed reduction in the relative rate of rotation of said shafts.

Another object of this invention is to provide mechanism for the transmission of power from a high speed shaft to a low speed shaft comprising gear devices mounted individually upon said shafts, and a member co-operating or meshing directly with said gear devices to render the rotation of one of them effective to the other.

Still another object of this invention is to provide means whereby power may be transmitted between a plurality of shafts which rotate at relatively different speeds, said means comprising gear members mounted upon said shafts and a combined worm and worm gear meshing directly with said gear members to render the rotation of one of them effective to the other, said combined worm and worm gear being arranged to lie between said gear members whereby by actuating one of said members toward the other member, backlash is eliminated.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a plan view of the main parts of the device, the driving worm being removed.

Fig. 2 is a sectional view on the line 2—2 of Fig. 1.

Fig. 3 is a plan view of the driving worm.

Fig. 4 is a vertical sectional detail on the line 4—4 of Fig. 1.

Referring now more particularly to the drawings, 10 represents a support or housing which may comprise a plurality of end plates 11 secured to the housing at 11$^a$ and having bearings to receive the high speed shaft 12 and the coaxial low speed shaft 13. Gear members or devices 12$^a$ and 13$^a$ are mounted upon the respective shafts and arranged to lie within said housing, and preferably so as to face each other. Between said gears a space is provided wherein a novel gear 14 is positioned in abutment relation with the gears 12$^a$ and 13$^a$ and having a stub shaft 15 arranged to co-operate with said support or housing to retain the gear 14 in rotatable position about an axis transverse to the axis of the shafts. Specifically said housing is provided with the inwardly extending portions 16 which are slotted at 17 in a direction generally parallel to the axis of the power transmission shafts. Within the slotted bearing, the stub shaft is arranged to ride, permitting the gear 14 to be movable in the direction of said slots but preventing a movement transversely thereto whereby said gear is retained in predetermined position for the transmission of power between the gears 12$^a$ and 13$^a$. However, due to the movable position of the gear 14, the gears 12$^a$ and 13$^a$ can be actuated directly toward each other and into meshing engagement or abutment with the gear 14 whereby backlash is eliminated, the slotted bearing construction thus providing for ease of assemblage and adjustment. The end plates 11 may be arranged to bear against the gears adjacent thereto as by means of the shoulders 11$^b$, anti-friction devices being used if desired, said plates being shimmed at 18 in relation to said housing to provide for the proper meshing abutment in the gear mechanism as aforesaid and also for a certain degree of resiliency or yielding of the parts depending upon the material used.

The gear member 14 comprises suitable teeth whereby a worm or other gear which operates on the same theory may cause a direct rotation of said gear member, as for instance the teeth 19 upon the gear 12$^a$, which then acts as the driver and rotates at high speed. Preferably the teeth upon the gear 14 are of the form of the teeth of a worm wheel as shown at 20 and indicated by the dot dash line $a$ and of such shape as to mesh with the teeth 19 which are designed to impart a uniform rotation to said gear member. Said gear member has also worm teeth 21 formed upon the surface aforesaid and intersecting the teeth 20, said worm teeth acting as the driver for the gear 13ª which has teeth 22 so formed as to mesh with said worm teeth, said teeth being preferably of double convex form to provide for a relatively large angle of approach and for a relatively large angle of recess to permit of the proper engagement and free sliding movement of said teeth. It will be noted that both the teeth 19 and the teeth 22 are arranged symmetrically about the axis of the shafts, and that the gear 12ª acts as a worm to cause rotation of the member 14, which as regards the gear aforesaid, acts as a worm wheel, but said member having worm teeth to constitute it a worm as regards the member or worm wheel 13ª. Thus the gear 12ª acts as the driver, while the gear 13ª acts as the driven gear, the member 14 being intermediate and acting as a driven member relatively to the drive gear and as a driver relatively to the driven gear. Due to the multiplicity of worms embodied in the unit, the speed reduction as between the driving and the driven members may be made extremely high, and this effect secured between directly co-axial shafts or members and with a minimum of moving parts. To secure a proper balance of the driving and driven gears, a plurality of intermediate gears 14 is used which are spaced from each other and operate in unison and in the same manner. One of said members may be regarded as being active in the transmission of power, while the other of said members may be regarded as idlers, all being similarly mounted in the housing 10. This housing can be regarded generally as a support whether fixed or movable. Thus if said housing is fixed a full and maximum reduction in speed is effected. If rotatable, as for instance under the control of a brake, the speed reduction can be varied in accordance with the rate of rotation of the housing, whether under the influence of the rotational force operating upon one of the shafts or by other means as desired. The turning moment upon the shaft 12 is less than that upon the shaft 13, and the former is consequently of smaller size than the latter. Similarly the teeth 20 are smaller than the teeth 21.

While the parts indicated are designed to produce a rotation of the two shafts in opposite directions, it is obvious that the device could be rearranged to operate the driven shaft in the same direction as the driver.

I claim:

1. In gearing mechanism, the combination with a pair of substantially coaxial shafts, of a worm fixed to one of said shafts, a gear fixed to the other shaft, and a combined worm and gear member meshing directly with the worm and gear aforesaid, and mounted in relatively movable relation in a direction substantially parallel to the direction of the shafts.

2. In transmission gearing, the combination with a low speed shaft and a parallel high speed shaft, of a pair of flat members mounted upon the respective shafts at right angles thereto in spaced relation to each other and having teeth upon the faces thereof directed toward each other, and a rotatable member therebetween and having a plurality of sets of teeth upon the face thereof to mesh directly with the teeth upon said members, the teeth upon the different parts being so arranged that said rotatable member will transmit a rotational force from one of said flat members to the other member, said rotatable member having one of said sets of teeth extending at an angle to the other, a housing being provided wherein said rotational member is mounted within a slotted bearing to be free to move in a direction parallel to the axis of said shafts.

3. In transmission gearing, the combination with a low speed shaft and a parallel high speed shaft, of a pair of flat members mounted upon the respective shafts at right angles thereto in spaced relation to each other and having teeth upon the faces thereof directed toward each other, and a rotatable member therebetween and having a plurality of sets of teeth upon the face thereof to mesh directly with the teeth upon said members, the teeth upon the different parts being so arranged that said rotatable member will transmit a rotational force from one of said flat members to the other member, said rotatable member having one of said sets of teeth extending at an angle to the other, a housing being provided, said housing having a slotted bearing wherein said rotational member may be mounted for movement parallel to the axis of said shafts but against movement transversely thereto, said housing being likewise provided with means for actuating said flat members toward each other to eliminate backlash.

4. In gearing transmission, the combination with a low speed shaft and a high speed shaft coaxial therewith, of a plurality of members mounted perpendicularly upon said shafts in spaced relation to each other and having teeth directed toward each other, a plurality of gear members mounted between said members and symmetrically about the axis of the shafts, said gear members acting to transmit a rotational force from one of said shafts to the other and having on their faces driver and driven teeth extending in different directions, the teeth upon one of said shaft members being arranged to mesh with the driven teeth, while the teeth upon the other of said members mesh with the driver teeth, said gear members serving to maintain a proper balance of the transmission device, and a housing within which said gear members are mounted and having means for directing the parallel shaft members toward each other to mesh more closely with said gear members.

5. The combination as in claim 4 wherein the gear members are mounted for movement in a direction parallel to the axis of the shafts but against movement transverse thereto to provide for ease of assemblage.

In testimony whereof I affix my signature.

JAMES P. BURKE.